(No Model.)
N. H. PINE.
ROPE LEADER FOR WINDING DRUMS.
No. 499,934. Patented June 20, 1893.
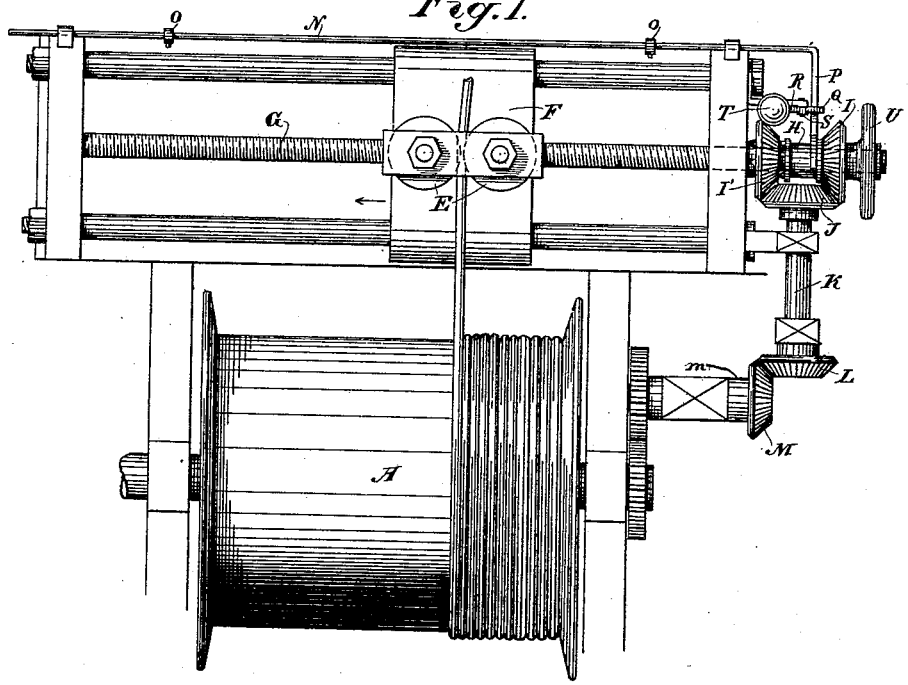
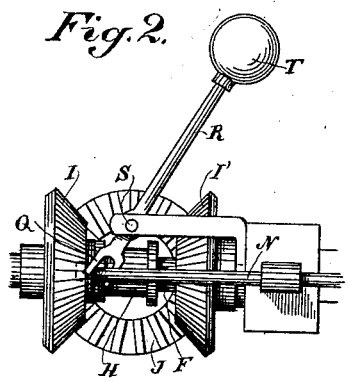
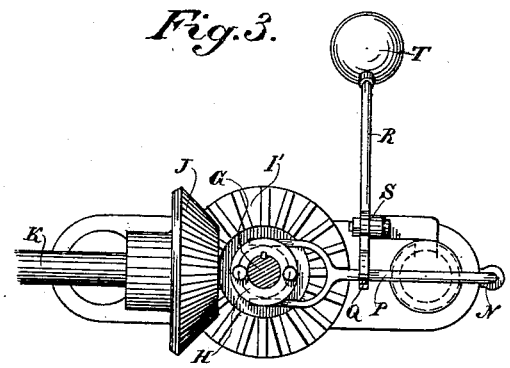
Witnesses,
Inventor,
Norton H. Pine
By Dewey & Co.
Attys

UNITED STATES PATENT OFFICE.

NORTON H. PINE, OF EUREKA, CALIFORNIA.

ROPE-LEADER FOR WINDING-DRUMS.

SPECIFICATION forming part of Letters Patent No. 499,934, dated June 20, 1893.

Application filed February 4, 1893. Serial No. 461,048. (No model.)

*To all whom it may concern:*

Be it known that I, NORTON H. PINE, a citizen of the United States, residing at Eureka, Humboldt county, State of California, have invented an Improvement in Rope-Leaders for Winding-Drums; and I hereby declare the following to be a full, clear, and exact description of the same.

My invention relates to a rope leading device for winding drums, and it consists in a mechanism whereby the rope is caused to wind evenly from one end of the drum to the other, and in an automatic means for reversing the movement of the leader upon reaching either end of the drum.

Referring to the accompanying drawings for a more complete explanation of my invention,—Figure 1 is a plan view of the winding drum and leader attachment. Fig. 2 is a side view showing the reversing mechanism. Fig. 3 is an end view of the same.

The object of my present invention is to provide an improvement upon a device for a similar purpose, patented January 31, 1893, No. 490,984.

My present invention relates more especially to the mechanism for reversing the movement of the traveler.

A is the drum upon which the cable is to be coiled, to which power is applied to rotate the drum from the engine in the usual manner.

The leader consists of pulleys E journaled vertically upon a traveler F, and sufficiently far apart to allow the cable to pass freely between them. The traveler F has a screw-threaded nut attached to or formed with it adapted to clasp the horizontal screw G, journaled in a suitable frame, and the rotation of this screw causes the traveler to move from one end to the other, and thus carry the leader pulleys E with it, so that the rope passing between these pulleys, is regularly laid upon the drum from one end to the other. The movement of the screw is then reversed so as to cause the traveler to move to the opposite end, and thus lay the cable evenly over that which was first laid upon the drum, and so on as long as the cable is to be wound upon the drum.

In order to automatically reverse the movement of the screw shaft, I have shown the following mechanism:—Upon one end of the screw shaft G is mounted a clutch H which is adapted to slide longitudinally upon a feather, and it has projecting lugs upon each of its ends which are adapted to engage with corresponding lugs upon the beveled gears I I' which turn loosely upon the screw-shaft at each side of the clutch H, and sufficiently distant from it, so that when one of them is engaged by the clutch, the other will be disengaged, and vice versa. These gears are driven in opposite directions by a beveled gear J which engages them as shown, and is fixed upon a shaft K having upon its opposite end a beveled pinion L which in turn engages a beveled gear M upon the intermediate gear shaft m, so that the rotation of the drum transmits motion to the beveled gears I and I'.

N is a rod extending parallel with the screw-shaft and having fixed upon it the adjustable collars O, so placed with relation to the traveler F, or some projection therefrom, that when the latter reaches the end of its travel in either direction, it will engage one or the other of these collars, and thus slide the rod N in the direction in which the traveler is moving. This rod N is formed with the clutch actuating lever P which passes through a fork Q at the lower end of a lever R which is fulcrumed as shown at S. The upper end of this lever has a heavy weight T fixed upon it, so that when the lever R has been moved sufficiently to carry the weight beyond a vertical line above its fulcrum point, the weight will fall by gravitation to the other side, and thus, acting through the rod P, will force the clutch H correspondingly to engage one of the bevel-gears I, and thus reverse the movement of the screw which has brought the traveler to this point. When the traveler reaches the other end of the screw, it will act upon the other one of the collars O on the rod N, and will again tilt the weighted lever R until it falls in the opposite direction, thus disengaging the clutch H from the gear I with which it was engaged and causing it to engage with the gear I' which, by reason of its rotation in the opposite direction, will again reverse the movement of the screw G. By this construction I am enabled to make the reversing action very positive and certain to act, whatever may be the speed at which the parts are moving. A hand-wheel U is fixed upon the end of the screw-shaft by which the latter may be turned by hand, if desired, when the clutch is released.

Having thus described my invention, what I claim as new, and desire to secure by Letters Patent, is—

1. A rope leader for winding drums consisting of the traveler having guides between which the rope passes before reaching the drum, a screw parallel with the axis of the drum and attached to the traveler so as to move the latter from end to end, a mechanism by which the screw is rotated, consisting of oppositely driven beveled gears turning loosely upon the screw-shaft, a clutch adapted to engage either of said gears after being disengaged from the other, said clutch sliding between the gears upon a feather on the screw-shaft with which it is rotatable, a weighted lever R fulcrumed so as to fall by gravitation in either direction after the weight has been moved beyond the vertical line of the fulcrum, the lower end of said lever being connected with and actuating the clutch simultaneously with the movement of the weight and means for automatically throwing the weight beyond the vertical line of the fulcrum, substantially as herein described.

2. In a rope leader for winding drums, a traveler having guides between which the rope passes before reaching the drum, a screw parallel with the axis of the drum, a nut fixed to the traveler and movable upon said screw, mechanism by which the screw is rotated, consisting of bevel-gears mounted loosely upon a screw-shaft and driven in opposite directions and a clutch sliding upon a feather on the screw-shaft between said gears and adapted to engage either of them, an arm by which the clutch is moved in either direction, a lever fulcrumed above said arm having the lower end forked to engage the arm, and having a weight upon the upper end which falls in either direction by gravitation, after the lever has passed the center, a sliding rod N extending parallel with the screw-shaft having adjustable collars fixed upon it in position to be engaged by the traveler when it reaches either end of the screw, said rod being connected with the lower end of the weighted lever whereby the latter is moved by the rod until the weight has been carried past a vertical line above the lever fulcrum and the weight acts by gravitation to complete the movement of the clutch, substantially as herein described.

In witness whereof I have hereunto set my hand.

NORTON H. PINE.

Witnesses:
S. H. NOURSE,
GEO. H. STRONG.